United States Patent
Aravot (10) Patent No.: US 10,848,405 B2
(45) Date of Patent: Nov. 24, 2020

(54) REPORTING PROGRESS OF OPERATION EXECUTING ON UNREACHABLE HOST

(71) Applicant: Red Hat Israel, Ltd., Ra'anana (IL)

(72) Inventor: Liron Aravot, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 584 days.

(21) Appl. No.: 15/427,394

(22) Filed: Feb. 8, 2017

(65) Prior Publication Data

US 2018/0227202 A1    Aug. 9, 2018

(51) Int. Cl.
*H04L 12/26*  (2006.01)
*G06F 9/455*  (2018.01)

(52) U.S. Cl.
CPC ...... *H04L 43/0811* (2013.01); *G06F 9/45558* (2013.01); *G06F 2009/45579* (2013.01); *G06F 2009/45595* (2013.01)

(58) Field of Classification Search
CPC . H04L 43/0811; H04L 43/06; H04L 43/0817; H04L 2009/45595; G06F 9/45558; G06F 2009/45595
USPC .......................................................... 709/224
See application file for complete search history.

(56) References Cited

U.S. PATENT DOCUMENTS

| | | | | |
|---|---|---|---|---|
| 8,291,070 | B2* | 10/2012 | Heim | G06F 11/0709 709/213 |
| 8,769,011 | B2 | 7/2014 | Baird et al. | |
| 8,924,967 | B2 | 12/2014 | Nelson et al. | |
| 9,405,483 | B1* | 8/2016 | Wei | G06F 3/065 |
| 2005/0076269 | A1* | 4/2005 | Tang | G06Q 10/087 714/48 |
| 2011/0314120 | A1* | 12/2011 | Gokhale | G06F 3/0605 709/213 |
| 2012/0030408 | A1* | 2/2012 | Flynn | G06F 12/0246 711/102 |
| 2012/0221729 | A1* | 8/2012 | Hara | G06F 3/0605 709/226 |
| 2012/0317084 | A1 | 12/2012 | Liu | |
| 2013/0086585 | A1* | 4/2013 | Huang | H04L 67/14 718/1 |
| 2013/0151888 | A1 | 6/2013 | Bhattiprolu et al. | |
| 2014/0130055 | A1* | 5/2014 | Guha | G06F 3/0604 718/104 |
| 2015/0095692 | A1 | 4/2015 | Thiele et al. | |

(Continued)

OTHER PUBLICATIONS

"Storage Architecture", Chapter 3, https://access.redhat.com/documentation/en-US/Red_Hat_Enterprise_Virtualization/3.3/html Technical_Reference_Guide/chap-Storage_architecture.html, 7 pages.

(Continued)

*Primary Examiner* — Sm A Rahman
*Assistant Examiner* — Chen-Liang Huang
(74) *Attorney, Agent, or Firm* — Lowenstein Sandler LLP (57) ABSTRACT

A method includes receiving, by a processing device of a first host from a virtualization manager via a network connection, a request to perform a storage operation on a storage volume associated with a storage domain, initiating the storage operation on the storage volume, responsive to determining that the network connection has been lost, storing a progress indicator of the operation in a volume metadata associated with the storage volume, and transmitting, to the virtualization manager, the progress indicator stored in the volume metadata.

18 Claims, 5 Drawing Sheets

(56) References Cited

U.S. PATENT DOCUMENTS

| | | | |
|---|---|---|---|
| 2015/0293708 A1 | 10/2015 | Lang et al. | |
| 2015/0347165 A1* | 12/2015 | Lipchuk | G06F 8/63 718/1 |
| 2016/0085460 A1 | 3/2016 | Chandrashekar | |
| 2016/0299750 A1* | 10/2016 | Koniges | G06F 8/61 |
| 2017/0140637 A1* | 5/2017 | Thurlow | G08B 25/016 |
| 2019/0228096 A1* | 7/2019 | Wang | G06F 11/1469 |

OTHER PUBLICATIONS

"Destination Unreachable Message" http://www.wildpackets.com/resources/compendium/tcp_ip/unreachable#host_unreachable, 1 page.
"Storage Architecture", Chapter 3, https://access.redhat.com/documentation/en-US/Red_Hat_Enterprise_Virtualization/3.3/html Technical_Reference_Guide/chap-Storage_architecture.html, 12 pages.
"Determining if your VMware vSphere HA Cluster has Experienced a Host Failure (2036544)" https://kb.vmware.com/selfservice/microsites/search.do?language=en_US&cmd=displayKC&externalId=2036544, Feb. 17, 2016, 9 pages.

* cited by examiner

```
┌─────────────────────────────────────────────────────────────────────┐
│ Receive, by a processing device of a first host from a virtualization manager via a │
│ network connection, a request to perform a storage operation on a storage │
│ volume associated with a storage domain                             │
│                                                                 310 │
└─────────────────────────────────────────────────────────────────────┘
                                    │
                                    ▼
┌─────────────────────────────────────────────────────────────────────┐
│           Initiate the storage operation on the storage volume      │
│                                                                 320 │
└─────────────────────────────────────────────────────────────────────┘
                                    │
                                    ▼
┌─────────────────────────────────────────────────────────────────────┐
│ Responsive to determining that the network connection has been lost, store a │
│ progress indicator of the operation in a volume metadata associated with the │
│                         storage volume                              │
│                                                                 330 │
└─────────────────────────────────────────────────────────────────────┘
                                    │
                                    ▼
┌─────────────────────────────────────────────────────────────────────┐
│ Transmit, to the virtualization manager, the progress indicator stored in the │
│                         volume metadata                             │
│                                                                 340 │
└─────────────────────────────────────────────────────────────────────┘
```

REPORTING PROGRESS OF OPERATION EXECUTING ON UNREACHABLE HOST

TECHNICAL FIELD

The implementations of the present disclosure relate to computing infrastructures and, more specifically, to reporting current progress of volume-related operations executing on an unreachable host.

BACKGROUND

A data center can include a virtualized physical system. The virtualized system, supporting virtual machines (VMs), can consolidate the data center infrastructure and increase operational efficiencies. A virtual machine (VM) may be a software-based emulation of computer hardware. For example, the VM may operate based on computer architecture including computer hardware resources associated with hard disks or other such memory. The VM may emulate a physical computing environment. A virtualization layer of a host machine may manage requests for a hard disk or memory. This type of virtualization results in multiple VMs sharing physical resources.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

A virtualization manager is a software application executed by a processing device (e.g., a host machine or an independent computing device) for centralized management of virtualized systems. The virtualization manager may manage a shared storage environment that may include a plurality of host computer systems. Each host computer system (also referred to herein as a "host") may be communicatively coupled, via a network, to one or more storage domains that store disk images of virtual machines. "Storage domain" herein refers to an atomic storage unit, such as a mount point or a folder for a file-based storage, or a group of logical unit numbers (LUNs) for a block-based storage.

The host may include processing devices to execute one or more virtual machines (VMs). The VM may utilize a virtual disk that comprises one or more volumes. Each volume may comprise areas for storing the disk image data, and metadata that stores information related to the volume used in the virtual disk, such as whether the volume is shared or has any child volumes.

The virtualization manager may receive a progress indicator (data representing job progress) from a host by polling the memory of the host when the virtualization manager is connected to the host via a network. Because the progress indicator is stored in a memory of the host, the polling incurs minimum communication overhead to the virtualization manager. The network connection between the virtualization manager and the host, however, can sometimes become unavailable while the job is still being performed by the host. In this scenario, the virtualization manager cannot receive a response by polling the host while the operation is still being performed by the host. Although the network connection between the virtualization manager and the host may have been lost, the virtualization manager may still need to receive the job progress information. Implementations of the present disclosure provide a technical solution that can generate a report of the status of a job performed by a host in a shared storage environment when a direct network connection to the host becomes unavailable. The virtualization manager may retrieve the report through a different host that still can be reached via the network.

In some implementations, the host may perform certain operations (e.g., move, copy, update, delete, etc.) on data of the virtual disk. For example, the host may execute an update operation which comprises instructions to copy data of the virtual disk from one volume to another volume. The host may copy data to consolidate space on the system for processing efficiency. During copying the data from one volume to another, however, unforeseen circumstances (e.g., an electrical or network outage) can interrupt the transmission of the progress update to the virtualization manager that may have been monitoring the status of operations executing on a host. To perform certain data operations (e.g., a copy operation) on a volume in the shared storage, the virtualization manager may submit a request to a host that is capable of performing the operation. The virtualization manager may assign an identifier to the request. Using the identifier, the virtualization manager may poll the host and receive status data associated with the operation. The status data may include, among other information, a progress data (e.g., a ratio of data that have been copied to the total amount of data to be copied for the copy operation) relating to the operation. The host may store the status data including the progress data in a memory of the host. The virtualization manager may then poll, e.g., via a network connection, the memory of the host to receive a report including the status data from the host. Thus, the virtualization manager may receive the status data without incurring much overhead. In some implementations, the virtualization manager may perform the polling according to a determined schedule (e.g., at a fixed time intervals). Thus, the virtualization manager may poll the status data periodically or responsive to a triggering event.

If the connection between the virtualization manager and the host becomes unavailable, the virtualization manager may poll a second host associated with the first host to acquire status information (including progress data) of operation. For example, the status information may include an indicator indicating whether an operation executed by a first host is still underway, failed, or succeeded. The virtualization manager acquires the status information without having to access the first host to request status information regarding the operation. In some implementations, before the first host initiates an operation, such as a copy operation from a source volume to a destination volume, the first host may acquire an exclusive lease associated with the destination volume. If the lease is acquired, the first host modifies an indicator (e.g., bit flag) in a metadata area associated with the destination volume to indicate that the volume's contents are invalid. Then, the first host starts the operation to copy data from the source volume to the destination volume. When the copying is finished, the first host updates the metadata associated with the destinations volume by clearing the indicator to indicate that the volume's contents are valid. Thereupon, the first host releases the lease associated with the volumes.

To determine status information of the operation performed by the first host, a second host may check the status of the lease associated with the destination volume. If the second host cannot acquire the lease, the second host may assume that the other host is still executing the operation. If the second host can acquire the lease, then the second host can examine the metadata associated with the destination volume to determine whether the volume's contents are valid. If the metadata indicates the contents are valid, then the second host may assume that the first host has successfully completed an operation. Otherwise, the second host may, in view of the metadata, assume that the operation of the other host has failed. Thus, the second host may receive certain information relating to the operation executing on the first host, and the virtualization manager may receive the information relating to the operation via the second host.

Although the second host may provide certain information about the status of the operation performing on the first host, the second host typically does not possess the information relating to the progress (e.g., the percentage of completion) of the operation executing on the first host. When the first host is performing a large job (e.g., copying a large amount of data from a first volume to a second volume), the virtualization manager may need to monitor the progress by receiving the progress data relating to the operation executing on the first host even when the network connection between the virtualization manager and the first host is unavailable.

Implementations of the present disclosure provide a method to generate a metadata including a progress data field for storing the progress data of the operation executing by the first host. In response to determining that the first host is connected to the virtualization manager, the first host stores the progress data in the memory that is polled by the virtualization manager. When the progress data is stored in the memory of the host, the virtualization manager may retrieve the progress data at minimum overhead. In this situation, the first host does not write the progress field of the metadata because writing to the metadata field, stored in a networked storage domain, can require more processor cycles than storing in the memory and/or create risk to the volume metadata. However, in response to determining that the connection between the first host and the virtualization manager become unavailable (i.e., when the virtualization manager cannot use the polling method to acquire the first host for the progress data), the first host stores the progress data relating to operation execution in the progress field of the metadata. In one implementation, the first host may carry out the storing operation according to a schedule. For example, the schedule may be specified by a user to write the progress data in the progress field at a fixed time intervals while the connectivity is lost. The virtualization manager may then retrieve the progress data of the operation using the second host as the progress data is updated in the progress field of the metadata.

Figure 1:
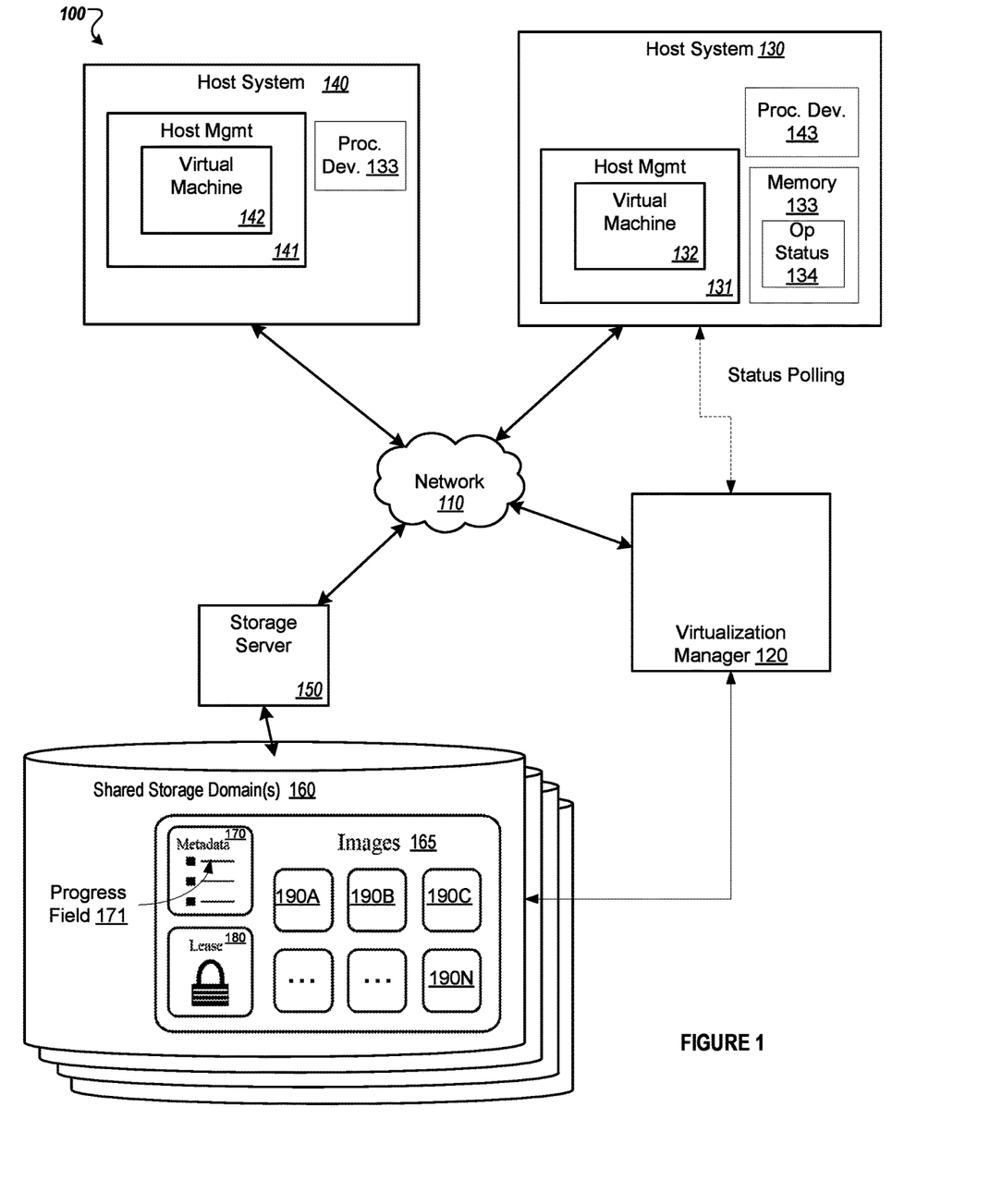
FIG. 1 illustrates an example system architecture in which implementations of the disclosure may operate.

FIG. 1 illustrates an example system architecture 100 in which implementations of the disclosure may operate. The system architecture 100 may include a network 110, a virtualization manager 120, a plurality of host computer systems 130 and 140, and one or more storage servers 150 coupled via the network 110. The network 110 may be a public network (e.g., the Internet), a private network (e.g., a local area network (LAN) or wide area network (WAN)), or a combination thereof. Network 110 may include a wireless infrastructure, which may be provided by one or multiple wireless communications systems, such as a wireless fidelity (WiFi) hotspot connected with the network 110 and/or a wireless carrier system that can be implemented using various data processing equipment, communication towers, etc.

Virtualization manager 120 may include one or more software modules being executed by a computer, such as a server computer, for centralized management of the system architecture 100. In one implementation, the virtualization manager 110 may comprise various interfaces, including administrative interface, reporting interface, and/or application programming interface (API) to communicate with the host system 130,140 of the system architecture 100, as well as to user portals, databases, directory servers and various other components which are omitted from FIG. 1 for clarity.

Each of the host systems 130,140 may comprise one or more processing devices 133, 143 (e.g., central processing units (CPUs)) communicatively coupled to memory devices and input/output (I/O) devices, as described in more details herein below with references to FIG. 5. Each of host computer systems 130,140 may run a plurality of virtual machines 132,142, by executing a hypervisor (not shown) to provide an abstraction of the physical layer, including processing devices, memory, and I/O devices, and present this abstraction to the virtual machines as virtual devices. The virtual machines 132,142, may execute a guest operating system that may utilize the underlying virtual devices, including virtual processors, virtual memory, and virtual I/O devices. One or more applications may be running on virtual machine under the guest operating system. Each host system 130,140 may run a host management module 131, 141 that manages and monitors various aspects of the host operation, including the storage, memory and network interfaces. In an illustrative example, host management modules 131,141 may be provided by a Virtual Desktop and Server Management (VDSM) daemon.

In certain implementations, host systems 130,140 may be grouped into one or more logical groups that may be also referred to as a "data center" or "cluster". A data center may represent a higher level of abstraction in a virtualization model. Each data center may be communicatively coupled, via the network 110, to one or more storage domains 160 storing disk images 165 of virtual machines, such as virtual machines 132, 142.

The storage domains 160 can store one or more virtual machine disk images 165, metadata 170, and lease area 180. In an illustrative example, example storage domain 160 may employ file-based storage, in which case disk images 165, domain metadata 170, and a domain lease 180, are provided by respective files. In another illustrative example, example storage domain 160 may employ block-based storage, in which case disk images 165, metadata 170, and a lease area 180, are provided by respective logical volumes.

Each disk image 165 (also referred to as a virtual disk) may comprise one or more volumes 190A-190N, as schematically illustrated by FIG. 1, for storing disk image data. A disk image may represent a volume chain comprising one or more copy-on-write (COW) volumes, where each of the COWs (referred to as a snapshot) contains all the content information of the disk at a certain point in time. From the perspective of a virtual machine, these volumes appear as a single disk image, as the hypervisor presents the virtual disk to a virtual machine. Initially, a virtual machine disk image may only comprise one raw or COW volume, which may be made read-only before the first boot of the virtual machine. The snapshot creation operation may trigger adding a new COW volume to the volume chain. The newly created volume may be made writable, and may only store disk blocks or files which have been modified or newly created by the virtual machine after the previous volume ("layer") has been made read-only. One or more volumes may be added to the volume chain during the lifetime of the virtual machine or even when the virtual machine is down. In some implementations, making the previous volume read-only (e.g., responsive to receiving a command via an administrative interface), triggers adding of a new COW volume. The virtual disk device implemented by the hypervisor locates the data by accessing, transparently to the virtual machine, each volume of the chain of volumes, starting from the most recently added volume.

Metadata 170 associated the storage domains 160 may include references to associated volumes (e.g., to parent or child volumes in a copy-on-write chain) and/or other information that may be utilized for volume identification, management, creation, modification, removal, and/or for performing file operations with respect to the data stored on the volumes 190A-190N in the storage domain 160.

In some implementations, a host system, such as host system 130 and 140, may perform certain operations (e.g., move, copy, update, delete, etc.) on data of disk images 165. In one implementation, the operation may include copying data of the disk images 165 from one volume to another volume. Implementations of the present disclosure can determine a status of this operation without directly polling the host system for such information. In particular, implementations of the present disclosure can report the progress of the host operation to virtualization manager 120 when the connection between the host and the virtualization 120 becomes unavailable.

For convenience of description, it is assumed that virtualization manager 120 issues a request to host 130 to perform an operation associated with shared storage domain 160 accessible by host 140. The request is identified by a request identifier. As shown in FIG. 1, host 130 may include a processing device to execute host management 131 including virtual machine 132. Host 130 may perform an operation associated with the request made by virtualization manager 120. For example, the requested operation may copy data from a first volume (e.g., 190A) to a second volume (e.g., 190B) associated with images 165. The execution of the operation on the shared storage domain 160 may take an extended period of time when the size of the data being copied exceeds a determined quantity. During the performance of the copy operation, virtualization manager 120 may poll the host to receive the status of the operation, in particular, the progress of the copy operation. The progress data may include the ratio of data that has been copied from the first volume to the second volume to the total amount of data to be copied.

In one implementation, dependent upon the availability of the network connection between host 130 and virtualization manager 120, host 130 may provide different communication paths to report the operation progress to virtualization manager 120.

Host 130 may first determine whether the network connection between virtualization manager 120 and host 130 is available. In one implementation, virtualization manager 120 may set a flag via shared storage domain 160 to inform host 130 that the communication path between virtualization manager 120 and host 130 becomes unavailable. For example, virtualization manager 120 may set a message flag in a message field in metadata 170 to inform host 130 that the network connection between virtualization manager 120 and host 130 become unavailable. Host 130 may periodically check the value of the message flag stored in the message field in metadata 170 to determine whether the communication path is available. Alternatively, host 130 may check the value of the message flag after not receiving a request from the virtualization manager over a threshold value. For example, the message flag may be set to "0" to indicate that the communication path is unavailable and set to "1" to indicate that the communication path is available.

In another implementation, virtualization manager 120 may poll host 130 for the operation status 134 stored in a memory 133 of host 130. Virtualization manager 120 may poll according to a schedule (e.g., at a fixed time intervals). Host 130 may receive the requests from virtualization manager 120. The reception of these requests indicates to host 130 that the communication path between virtualization manager 120 and host 130 is operational. Host 130 may also attempt to send messages to virtualization manager 120, and determine that the communication path is unavailable after the messages delivery fails for multiple times. Responsive to detecting that there are no requests from virtualization manager 120 (e.g., over a determined time), host 130 may determine that the communication path between virtualization manager 120 and host 130 is unavailable.

As shown in FIG. 1, host 130 may include memory 133 to store an operation status data 134. Host 130 may record the operation progress as part of the status data 134 in memory 133. The recording may occur according to a schedule (e.g., at a fixed time intervals or at a fixed ratio of progresses such as 10%, 20%, etc.). The status data 134 may be reported to virtualization manager 120 at minimum overhead when the communication path between virtualization manager 120 and host 130 is available. Thus, host 130, as discussed above, may determine that the communication path is available, and in response, store status data 134 including the progress data in memory 133 so that the progress data can be reported to virtualization manager 120 at a minimum cost.

When host 130 determines that the communication path becomes unavailable as described above, host 130 may use the field 171 of metadata 170 to store the progress data. Because writing progress data to field 171 of metadata 170 in shared storage domain 160 requires storing status information over a network, the write operation associated with the metadata can require more processor cycles than storing in the memory and/or risk the volume metadata. Thus, host 130 does not store the progress data in field 171 when the communication path is determined to be available by host 130. Instead, when the communication path is available, host 130 does not update field 171 storing the metadata (e.g., leaving it empty). Responsive to detecting that the communication path between virtualization manager 120 and host 130 becomes unavailable, host 130 may start to store the progress data in field 171 according to a user-specified schedule (e.g., in a pre-configured time interval or in a pre-configured ratio of completion). The progress data may include a value representing the ratio of completion of the operation performed on host 130. In one implementation, when the network connection is restored, the host may stop updating the progress on the storage device and clear the progress data to null.

Figure 2:
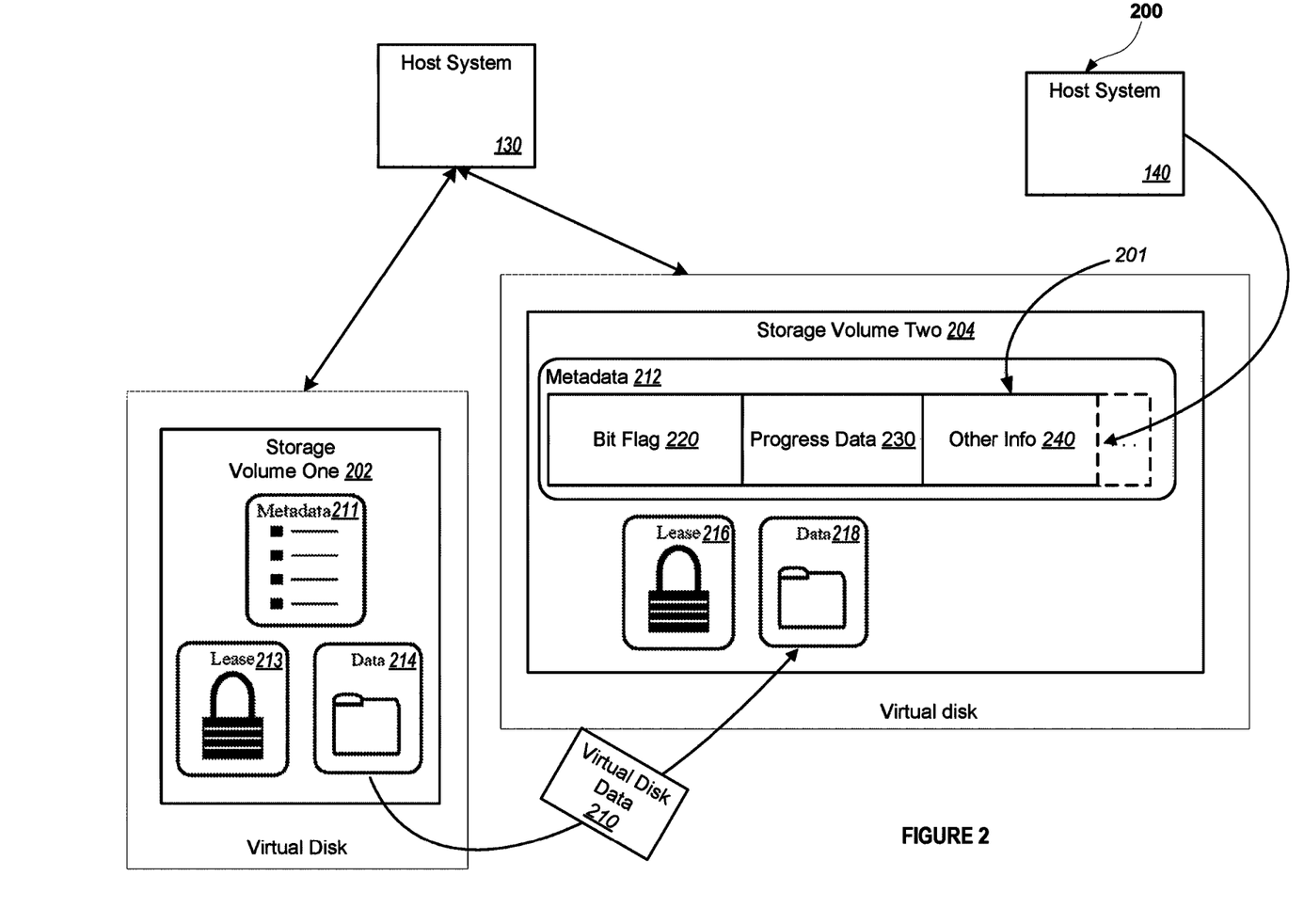
FIG. 2 illustrates an example of a system including a data structure in accordance with one implementation of the disclosure.

In one implementation, virtualization manager 120 may retrieve the progress data using another host 140 (which is still connected to the virtualization manager 120) as described in detail in conjunction with FIG. 2.

FIG. 2 illustrates an example of a system 200 including a metadata data structure 201 in accordance with one implementation of the disclosure. As shown, the system 200 includes host systems 130 and 140 of FIG. 1. In some implementations, the host systems 130 and 140 may be communicatively coupled, via a network (e.g., network 110), to one or more storage domains (e.g. shared storage domains 160) that comprise a plurality of volumes, such as storage volume one 202 and volume two 204. Each storage volume may be stored in the same storage domain or on different storage domains that may be geographically dispersed. The storage volumes 202 and 204 store data (e.g., virtual disk data 210) for disk images of virtual machines.

As shown in FIG. 2, the storage volumes 202, 204 may respectively include volume metadata areas 211, 212, volume lease areas 213, 216 and volume data areas 214, 218. In some implementations, the storage volumes 202, 204 may be implemented using file-based storage, in which case volume data areas 214, 218, volume metadata areas 211, 212, and volume lease areas 213, 216 may be provided by respective files. In other implementations, the storage volumes 202, 204 may be implemented using block-based storage, in which case volume data areas 214, 218 may be provided by a logical volume, while the volume metadata areas 211, 212, and volume lease areas 213, 216 may be provided by segments of respective logical volumes storing metadata and lease information for a plurality of the storage domain volumes. The logical volume segments may be identified by an offset with respect to the logical volume starting block or by an index within an array of pointers identifying the logical volume segments corresponding to the storage domain volumes.

Each storage volume 202,204 may comprise a volume data area (e.g., volume data area 214, 218) for storing the disk image data. The volume metadata areas (e.g., volume metadata area 211, 212) may be employed for storing references to associated volumes (e.g., to parent or child volumes in a copy-on-write chain) and/or other information that may be utilized for volume identification, management, creation, modification, removal, and/or for performing file operations with respect to the files stored on the volume.

In some implementations, the volume metadata areas 211 may store the metadata data structure 201. In one implementation, the data structure 201 is used to indicate the status of a host operation executed by the host systems, such as host systems 130 and 140, against the storage volumes 202, 204. For example, the host operation may include copying data from the data area 212 of storage volume one 202 to the data area 218 of storage volume two 204. The data structure 201 may represent a single data structure or multiple data structures residing in the volume metadata areas 211,212. In some implementations, the metadata data structure 201 may comprise various kinds of data elements, such as an array, tree, list or other types of data structures, comprising entries to store information related to the host operation.

Information stored in the data structure 201 of the metadata 212 may include, for example, a bit flag 220, progress data 230 to indicate a ratio of completeness of the host operation, as well as other information 240. The host system executing the host operations may set the bit flag 220 to a value of either 1 or 0. If the bit flag 220 is set to 1, this may represent that data associated with the host operation is invalid indicating that the host operation is incomplete while the lease is still checked out by the first host, indicating that the operation is still ongoing. If the bit flag 220 is set to 0, this may represent that data associated with the host operation is valid indicating that the host operation is complete. The progress data 230 may also have a value that is stored in the data structure 201. For example, the progress data 230 may be set to a ratio completion value that is applicable to the host operation.

In operation, a host system, such as host system 130, may acquire a lease with respect to the volumes 202-204. The host system may acquire the lease before the host system executes an operation, for example, to copy virtual disk data 210 from volume one 202 to volume two 204. In one implementation, the host system 130 may implement a locking protocol (also referred to as SanLock) that uses the lease area (e.g., lease area 213, 216) associated with each volume to implement a distributed locking technique. This locking protocol is used to request a lease that grants the host system 130 an exclusive access to the storage volumes 202, 204 to prevent other hosts from accessing the volume while the lease is active. In some implementations, the lease information may be stored in the respective leases areas 213, 216 of the storage volumes 202, 204. The host system 130 must continually renew a lease after a determined time period, or the lease on the volume will be surrendered.

After the lease is obtained with respect to the storage volumes 202, 204, the host system 130 modifies the data structure 201 associated the destination volume (e.g., storage volume two 204). For example, the host system 130 may set an indicator, such as the bit flag 220 of the data structure 201, to value (e.g., 1). By setting the bit flag, the host system 130 indicates that the virtual disk data 210 with regards to volume two 204 is invalid and is not ready to be accessed from that volume. Then, the host system 130 initiates an operation with respect to the virtual disk data 210. For example, the host system 130 may execute an instruction to copy the virtual disk data 210 from the data area 214 of volume one 202 to the data area 218 of storage volume two 204.

In one implementation, responsive to determining that the network connection to the virtualization manager becomes unavailable, the host system 130 updates the progress data 230 of the data structure 201 during execution of the host operation. For example, the host system 130 may update the progress data 230 to a value corresponding to a ratio of the completeness of the operation being executed. In some implementations, the host system 130 may update the progress data 230 when a certain threshold ratio of the operation has completed, such as at five percent (5%) increments. In one implementation, when the network connection is restored, the host may stop updating the progress on the storage device and reset the progress data to its initial value (e.g., 0%).

Upon completion of the host operation, the host system 130 updates the data structure 201 in the volume metadata area 212 of the destination volume. For example, the host system 130 may clear the bit flag 220. This is done by the host system 103 to indicate the virtual disk data 210 with regards to storage volume two 204 is valid and is now ready to be accessed from that volume. Thereupon, the lease associated the storage volumes 202 and 204 are released. For example, the host system 130 utilize the locking protocol to release the lease with respect to each storage volume 202, 204. In some implementations, the lease information that was stored in the respective leases areas 213, 216 of the storage volumes 202, 204 is removed so that other hosts can now access these storage volumes 202, 204.

In accordance with the disclosure, a second host, such as host system 140, is able to determine the state of the host operation associated with virtual disk data 210 on storage volume two 204 without having to retrieve any state information from host system 130. In some situations, the host operation 130 may have yet completed successfully because it was terminated before completion due to some type system of network issue.

In operation, the second host like host system 140 checks a lease status in the lease area on the storage domain associated with a volume, such as storage volume two 204. For example, the host system 130 may utilize the locking protocol to request a lease on storage volume two 204. In some situations, the locking protocol may deny the lease request of the second host system 140 because a lease on storage volume two 204 is unavailable. If the lease is unavailable, the second host system 140 may determine that the host operation is incomplete because another host system 130 is still holding onto a lease for storage volume two 204. In this regard, if the lease is not renewed by the holder after a certain period of time, the lease will eventually expire. At that time, the second host system 140 is able to make a request to acquire a lease with respect to storage volume two 204

In response to acquiring the lease, the second host system 140 then identifies a data structure 201 on storage volume two 204. For example, the data structure 201 may be identified in the metadata 212 of the volume 204. In view of modifications to the data structure, the host system 140 can determine whether an operation related to the virtual disk data 210 on storage volume two 204 has succeeded for failed. For example, the host system 140 may examine an indicator, such as bit flag 220, stored in the data structure 201. This bit flag 220 indicates whether the virtual disk data 210 on storage volume two 204 is valid or invalid. If the virtual disk data 210 is invalid, this indicates that a host operation related to the virtual disk data 210 on storage volume two 204 failed. Otherwise, the host operation completed successfully. In some implementations, the second host system 140 may also examine the progress data 230 stored in the data structure 201 that indicates the extent of completeness of the host operation by the other host, such as a ratio of completion over the total amount of data to be copied.

Figure 3:
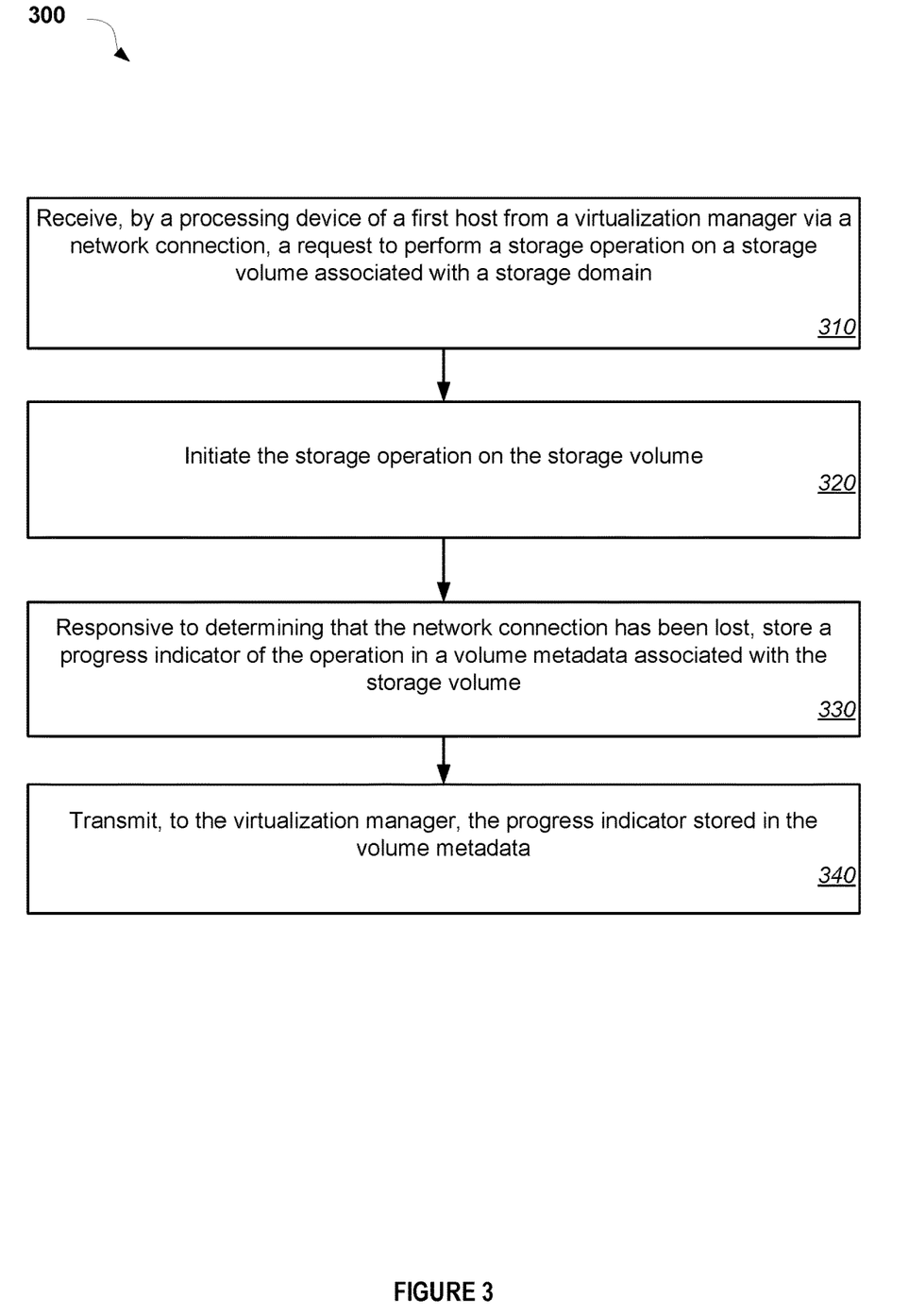
FIG. 3 is a flow diagram of an example method to report progress of an operation executing on an unreachable host in accordance with one implementation of the disclosure.

FIG. 3 is a flow diagram of an example method 300 to report progress of an operation executing on an unreachable host in accordance with one implementation of the disclosure. In one implementation, a host system (e.g., host system 130 or host system 140 of FIG. 1) may perform method 300. The method 300 may be performed by processing logic that may comprise hardware (circuitry, dedicated logic, etc.), software (e.g., software executed by a general purpose computer system or a dedicated machine), or a combination of both. In alternative implementations, some or all of the method 300 may be performed by other components of the shard storage system. In other implementations, the blocks depicted in FIG. 3 can be performed simultaneously or in a different order than that depicted.

As shown, method 300 begins at block 310 where a processing device of a first host may receive, from a virtualization manager via a network connection, a request to perform a storage operation on a storage volume associated with a storage domain. In block 320, the processing device may initiate the storage operation on the storage volume. In block 330, responsive to determining that the network connection has been lost, the processing device may store a progress indicator of the operation in a volume metadata associated with the storage volume. In block 340, the processing device may transmit, to the virtualization manager, the progress indicator stored in the volume metadata.

Figure 4:
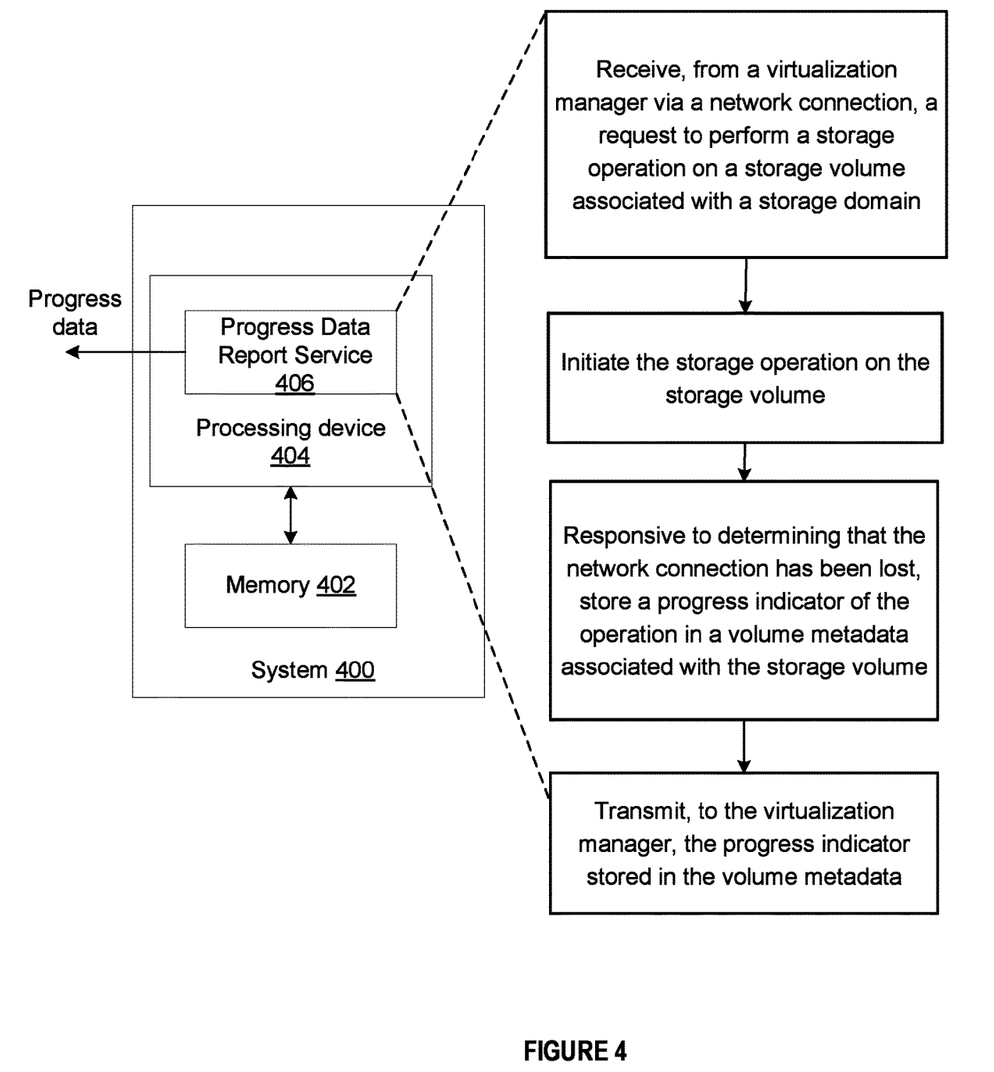
FIG. 4 is a system to report progress of an operation executing on an unreachable host according to an implementation of the present disclosure.

FIG. 4 is a system 400 to report progress of an operation executing on an unreachable host according to an implementation of the present disclosure. System 400 may include a memory 402 and a processing device 404 communicatively coupled to memory 402. The processing device 404 may execute a progress data report service 406 to receive, from a virtualization manager via a network connection, a request to perform a storage operation on a storage volume associated with a storage domain, initiate the storage operation on the storage volume, responsive to determining that the network connection has been lost, store a progress indicator of the operation in a volume metadata associated with the storage volume, and transmit, to the virtualization manager, the progress indicator stored in the volume metadata.

Figure 5:
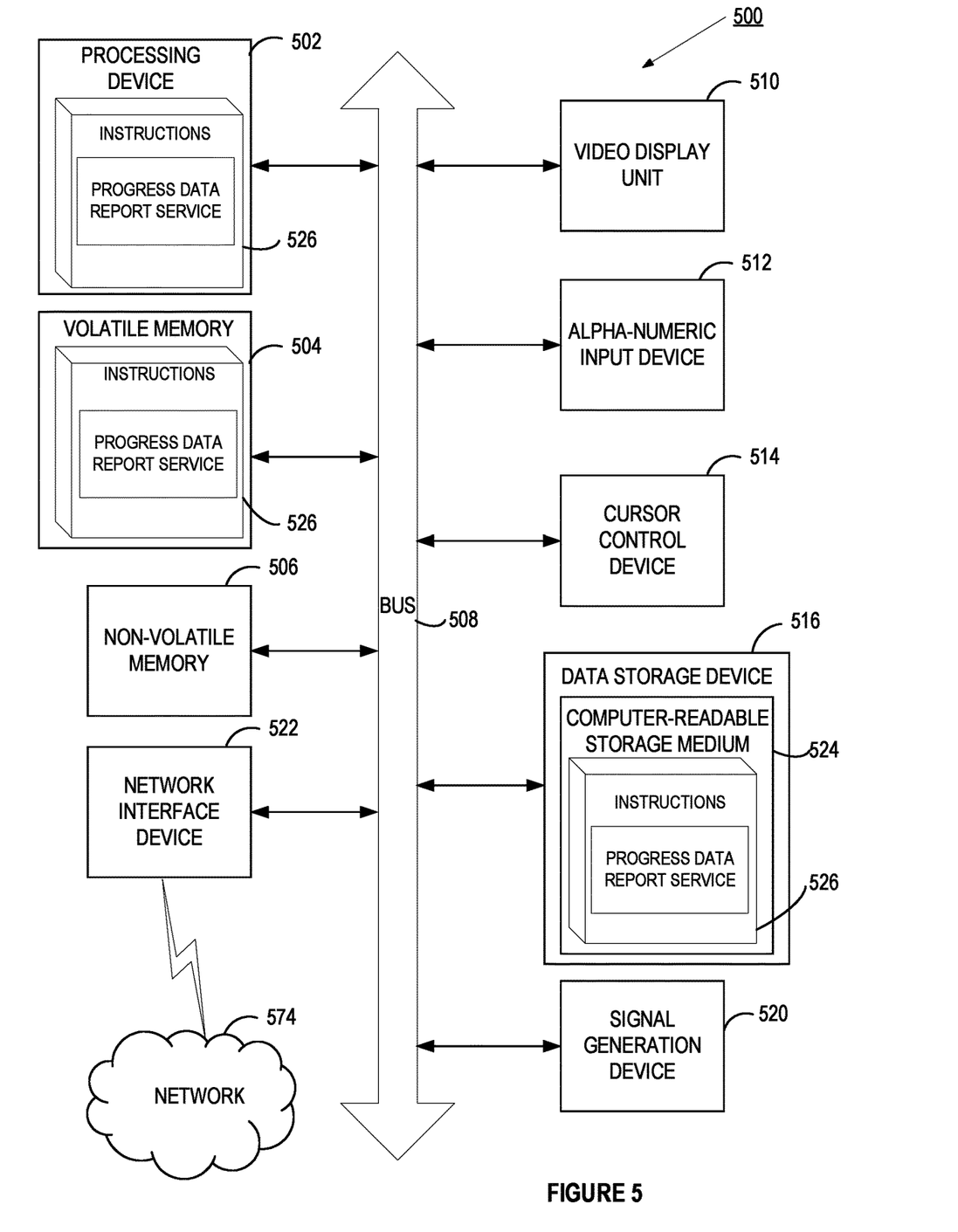
FIG. 5 illustrates a block diagram of an implementation of a computer system in which some implementations of the disclosure may operate.

FIG. 5 depicts a block diagram of a computer system operating in accordance with one or more aspects of the present disclosure. In various illustrative examples, computer system 500 may correspond to a computing device within system architecture 100 of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding output volume control of FIG. 1 for implementing method 300.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device of a first host system operating one or more virtual machines by executing a hypervisor, from a virtualization manager connected to the first host system via a network, a request to perform a storage operation on a storage volume that comprises a disk image of the one or more virtual machines, wherein the virtualization manager manages a plurality of host systems comprising the first host system;
   initiating, by the processing device of the first host system, the storage operation on the storage volume;
   determining, by the processing device of the first host system, in view of a message flag stored in a volume metadata of the storage volume, that a connection between the first host system and the virtualization manager has been lost; and
   in view of availability of connection between the virtualization manager and the first host system via the network, storing status data in a memory of the first host system or in the volume metadata of the storage volume, wherein the storing of the status data comprises:
      responsive to determining that the connection between the first host system and the virtualization manager is unavailable, storing, by the processing device of the first host system, the status data in the volume metadata of the storage volume, and
      responsive to determining that the connection between the first host system and the virtualization manager is available, storing the status data in the memory of the first host system, wherein the storage volume is accessible by the plurality of the host systems via the network and comprises data for the respective disk image and the volume metadata, the status data representing the status of the storage operation.

2. The method of claim 1, further comprising:
   responsive to determining that the connection is restored, storing the status data in the memory of the first host system; and
   transmitting, to the virtualization manager via the network, the status data.

3. The method of claim 2, wherein storing the status data in the memory of the first host system comprises a fewer number of operations than storing the status data of the storage operation in the volume metadata.

4. The method of claim 1, wherein the storage operation comprises one of copying data to the storage volume from a second storage volume associated with a storage domain or copying the data from the storage volume to the second storage volume.

5. The method of claim 1, further comprises determining, in view of a time period elapsed since receiving a communication from the virtualization manager via the connection, that the connection between the first host system and the virtualization manager has been lost.

6. The method of claim 1, wherein the volume metadata comprises at least one of a bit flag to indicate completion of the storage operation or a progress indicator as a part of the status data to indicate a ratio of completion of the storage operation.

7. The method of claim 1, wherein the volume metadata is to be accessed by a second host system of the plurality of host systems responsive to a request from the virtualization manager.

8. A system comprising:
a memory; and
a processing device, communicatively coupled to the memory and operating one or more virtual machines by executing a hypervisor, to
receive, from a virtualization manager connected to the system via a network, a request to perform a storage operation on a storage volume that comprises a disk image of the one or more virtual machines, wherein the virtualization manager manages a plurality of host systems comprising the system;
initiate the storage operation on the storage volume;
determine, in view of a message flag stored in a volume metadata of the storage volume, that a connection between the first host system and the virtualization manager has been lost; and
in view of availability of connection between the virtualization manager and the first host system via the network, store status data in a memory of the first host system or in a volume metadata of the storage volume, wherein to store the status data, the processing device is to:
responsive to determining that the connection between the system and the virtualization manager is unavailable, store the status data in the volume metadata of the storage volume, and
responsive to determining that the connection between the first host system and the virtualization manager is available, store the status data in the memory of the first host system, wherein the storage volume is accessible by the plurality of the host systems via the network and comprises data for the respective disk image and the volume metadata, the status data representing the status of the storage operation.

9. The system of claim 8, wherein the processing device is further to:
responsive to determining that the connection is restored, store the status data in the memory of the system; and
transmit, to the virtualization manager via the network, the status data.

10. The system of claim 9, wherein storing the status data in the memory of the system comprises a fewer number of operations than storing the status data of the storage operation in the volume metadata.

11. The system of claim 8, wherein the storage operation comprises one of copying data to the storage volume from a second storage volume associated with a storage domain or copying the data from the storage volume to the second storage volume.

12. The system of claim 8, wherein the volume metadata comprises at least one of a bit flag to indicate completion of the storage operation or a progress indicator as a part of the status data to indicate a ratio of completion of the storage operation.

13. The system of claim 8, wherein the volume metadata is to be accessed by a second host system of the plurality of host systems responsive to a request from the virtualization manager.

14. A non-transitory computer-readable storage medium comprising executable instructions that when executed, by a processing device of a first host system, cause the processing device to:
receive, by the processing device of the first host system from a virtualization manager connected to the first host system via a connection, a request to perform a storage operation on a storage volume that comprises a disk image of one or more virtual machines, wherein the virtualization manager manages a plurality of host systems comprising the first host system;
initiate the storage operation on the storage volume;
determine, in view of a message flag stored in volume metadata of the storage volume, that the connection between the first host system and the virtualization manager has been lost; and
in view of availability of connection between the virtualization manager and the first host system via a network, store status data in a memory of the first host system or in a volume metadata of the storage volume, wherein to store the status data, the processing device is to:
responsive to determining that the connection between the first host system and the virtualization manager is unavailable, store the status data in the volume metadata of the storage volume, and
responsive to determining that the connection between the first host system and the virtualization manager is available, store the status data in the memory of the first host system, wherein the storage volume is accessible by the plurality of the host systems via the network and comprises data for the respective disk image and the volume metadata, the status data representing the status of the storage operation.

15. The non-transitory computer-readable storage medium of claim 14, wherein the processing device is further to:
responsive to determining that the connection is restored, store the status data in the memory of the first host system; and
transmit, to the virtualization manager via the network, the status data.

16. The non-transitory computer-readable storage medium of claim 15, wherein storing the status data in the memory of the first host system comprises a fewer number of operations than storing the status data of the storage operation in the volume metadata.

17. The non-transitory computer-readable storage medium of claim 14, wherein the volume metadata comprises at least one of a bit flag to indicate completion of the operation or a progress indicator as a part of the status data to indicate a ratio of completion of the storage operation.

18. The method of claim 1, further comprising:
receiving, by the processing device of the first host system, from the virtualization manager, a polling request to provide the status of the storage operation; and
responsive to the receiving of the polling request, transmitting, by the processing device of the first host system, to the virtualization manager, the status data stored in the memory of the first host system.

* * * * *